United States Patent

[11] 3,584,140

[72] Inventor Yasuharu Kubota
Kanagawa, Japan
[21] Appl. No. 12,375
[22] Filed Feb. 18, 1970
[45] Patented June 8, 1971
[73] Assignee Sony Corporation
Tokyo, Japan
[32] Priority Feb. 20, 1969
[33] Japan
[31] 12833/69

[54] REGISTRATION SYSTEM FOR COLOR TELEVISION CAMERA
6 Claims, 3 Drawing Figs.

[52] U.S. Cl. .......... 178/5.4R, 178/5.4ST
[51] Int. Cl. .......... H04n 9/08
[50] Field of Search .......... 178/5.4 STC, 5.44 TCC, 5.4 R, 5.4 M

[56] References Cited

UNITED STATES PATENTS

| | | | |
|---|---|---|---|
| 3,288,921 | 11/1966 | James et al. | 178/5.4TC |
| 3,340,356 | 9/1967 | James | 178/5.4TC |

*Primary Examiner*—Robert L. Griffin
*Assistant Examiner*—John C. Martin
*Attorneys*—Lewis H. Eslinger, Alvin Sinderbrand and Curtis, Morris & Safford

ABSTRACT: A color television camera including a first image pickup tube producing a luminance signal and a second image pickup tube producing a color video signal, is provided with a registration system that comprises a circuit for producing a composite luminance signal from the color video signal, a circuit for comparing that composite luminance signal with the luminance signal produced by the first tube and centering circuit for registering the signals from the two tubes when the comparison of the luminance signals indicates a difference therebetween.

INVENTOR

YASUHARU KUBOTA

INVENTOR.

YASUHARU KUBOTA

INVENTOR.
YASUHARU KUBOTA

REGISTRATION SYSTEM FOR COLOR TELEVISION CAMERA

This invention relates generally to a color television camera having two image pickup tubes, and more particularly to a system by which precise registration may be obtained of the signals from the two image pickup tubes.

A color television camera has been proposed which employs two image pickup tubes, one for producing a luminance signal and the other for producing a color video signal. The color video signal producing pickup tube is designed so that a color-separated image of an object to be televised is formed on the target of the pickup tube by the use of a striped color filter or by the combined use of a color filter and lenticular lens. This type of color television camera is smaller in its entirety and easier to adjust than a color television camera using three or four image pickup tubes. In comparison with a color television camera employing a single image pickup tube, the above color television camera employing a single image pickup tube, the above color television camera employing two image pickup tubes produces a color video signal having a luminance signal component of high frequency band to enable reproduction of an image with high resolution. However, there is the possibility that the images projected on the targets of the two image pickup tubes will not be in positional agreement with each other owing to an error in the optical paths, that is, an error in mounting of the optical devices relative to the image pickup tubes, thereby to cause misregistration of the reproduced pictures. Further, the misregistration of the reproduced pictures may be caused by an error in mounting of the deflection coils on the image pickup tubes or by dispersion in the shape of the deflection coils themselves. Thus, in a color television camera using two image pickup tubes, accurate superimposition or registration of the two video signals is absolutely necessary and such registration has been very difficult to achieve.

In accordance with this invention the registration of two video signals is achieved by effecting an adjustment that eliminates a difference signal between a luminance signal derived from one image pickup tube and a composite luminance signal derived from the other image pickup tube, that is, from the color video signal-producing pickup tube. This adjustment can be readily carried out by centering an electron beam in either one of the two image pickup tubes in such a manner as to remove the difference signal which, for example, may be reproduced on a monitoring picture tube. Although it might appear to be possible to achieve the adjustment by monitoring both the luminance signal and the composite luminance signal derived from the color video signal producing pickup tube, resolution of the picture tube imposes a severe limitation on the adjustment necessary for accurate registration of the two closely overlapping images that would appear on the monitoring picture tube.

The above, and other objects, features and advantages of the invention, will be apparent in the following detailed description of an illustrative embodiment thereof which is to be used in connection with the accompanying drawings, wherein.

Figure 1:
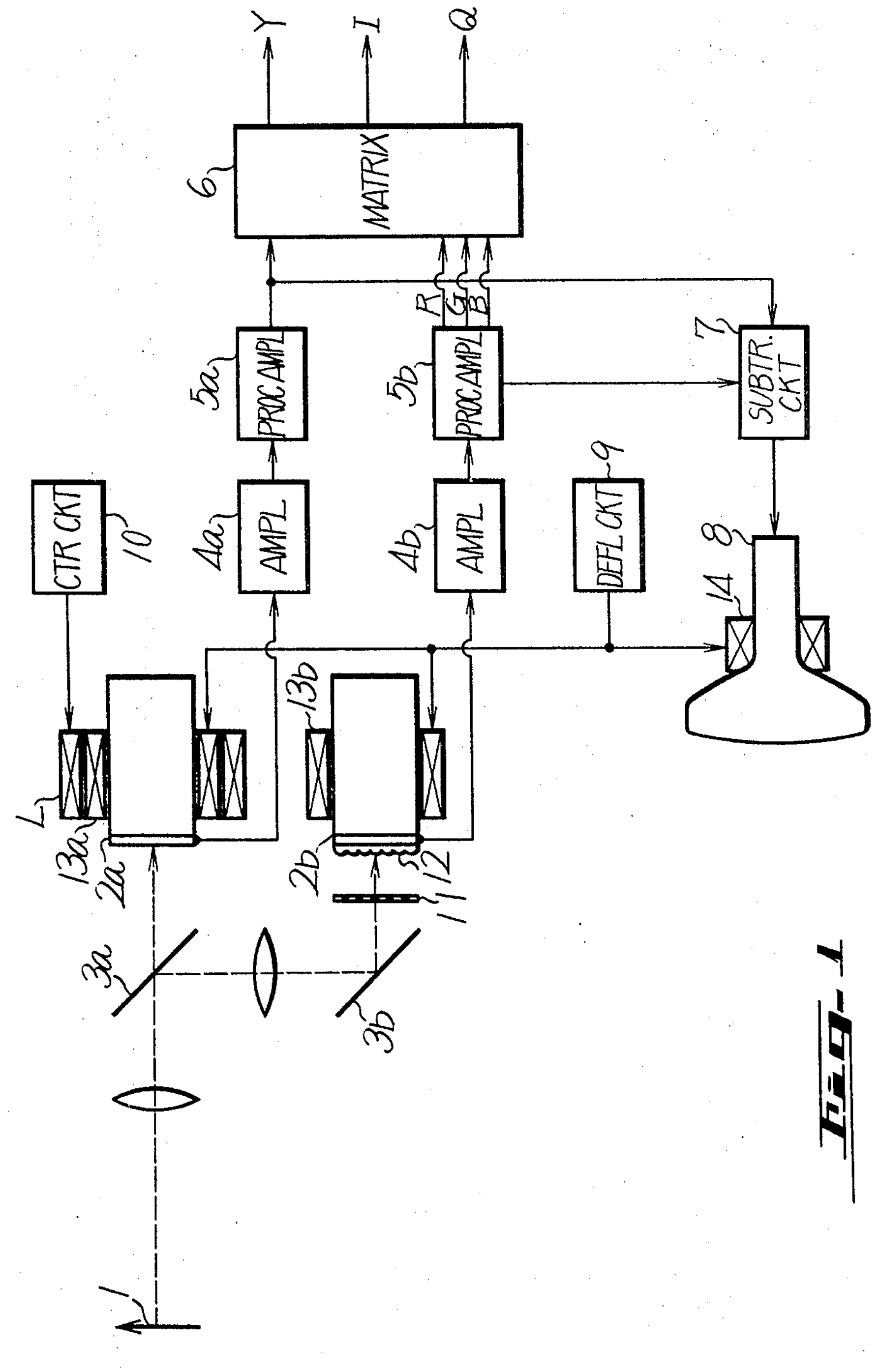
FIG. 1 is a diagram showing one example of a system according to this invention.

Referring to FIG. 1, it will be seen that, in a system according to this invention, an image of an object 1 to be televised is focused on the target of an image pickup tube 2*a*, for example, a vidicon, through a half mirror 3*a*, while, at the same time, a portion of the light forming the image is reflected by the half mirror 3*a* and a mirror 3*b* to provide an image-focused on the target of a vidicon 2*b*, as disclosed, for instance, in the U.S. Pat. application Ser. No. 799,241 filed Feb. 14, 1969, by the present inventor and others. Between the target of the vidicon 2*b* and the mirror 3*b* there are provided a color filter 11 and a lens screen 12 consisting of a plurality of lens elements, by means of which a color-separated image is formed on the target of the vidicon 2*b*. A luminance signal derived from the vidicon 2*a* is amplified by a preamplifier 4*a* and a process amplifier 5*a* so as to be of a required amplitude and is thereafter applied to a matrix circuit 6. From the vidicon 2*b*, a phase- or frequency-modulated color signal including red, green and blue signals R, G and B is derived and similarly fed to the matrix circuit 6 through a preamplifier 4*b* and a process amplifier 5*b*. The phase- or frequency-modulated color signal may be demodulated by the process amplifier 5*b* to be separated into individual color signals R, G and B which are respectively supplied to the matrix circuit 6. A luminance signal component Y and I and Q signals are derived from the matrix circuit 6 as the NTSC signals.

In accordance with the present invention, a portion of the luminance signal derived from the vidicon 2*a* is extracted from the output of, for example, the process amplifier 5*a*, and is supplied to one input terminal of a subtracting or comparing circuit 7. The other input terminal of the subtracting circuit 7 is supplied with a composite luminance signal of a band substantially corresponding to that of the luminance signal, and which is extracted, for example, by the process amplifier 5*b*, from the color signal derived from the vidicon 2*b*. From the output of the subtracting circuit 7 there is derived an error or difference signal when there is misregistration between the luminance signal and the composite luminance signal of the band corresponding to that of the former, and such difference signal is applied to a monitoring picture tube 8. Horizontal and vertical scanning signals are supplied to deflection coils 13*a*, 13*b* and 14 of the vidicons 2*a* and 2*b* and the monitoring picture tube 8 from a deflection circuit 9 common to them, thereby causing the respective electron beams to scan at substantially the same deflection sensitivity in accordance with the areas of the deflection scanning planes of the vidicon tubes 2*a* and 2*b* and the monitoring picture tube 8. Either one of the vidicons, for example, the vidicon 2*a*, is provided with a centering circuit 10 for supplying a centering coil L on such tube with a biasing current to suitably move the electron beam scanning position in horizontal and vertical scanning directions, for example, in response to manual adjustment of suitable controls included in circuit 10 or by normal displacement of coil L.

With the above arrangement, the monitoring picture tube 8 is usually supplied with an error or difference signal based upon disagreement in position of the images on the targets of the vidicons 2*a* and 2*b*. In the event that the images on both vidicons 2*a* and 2*b* are in positioned agreement with each other, the error or difference signal is decreased and substantially no picture is reproduced on the monitoring picture tube 8. When the images on the vidicons 2*a* and 2*b* are positionally in disagreement with each other, a picture is reproduced on the picture tube 8 based upon the error or difference signal resulting from the disagreement of the two images. More specifically, the picture reproduced on the picture tube 8 corresponds increasingly with the image of the object 1 in response to an increase in the disagreement in position of the two images on the vidicons 2*a* and 2*b*. Accordingly, the presence of the reproduced picture on the monitoring picture tube 8 indicates positional disagreement of the images on the both vidicons 2*a* and 2*b*, in which case the disagreement can be removed by adjusting the centering circuit 10 or the coil L in a manner to extinguish the picture reproduced on the monitoring picture tube 3.

Figure 2:
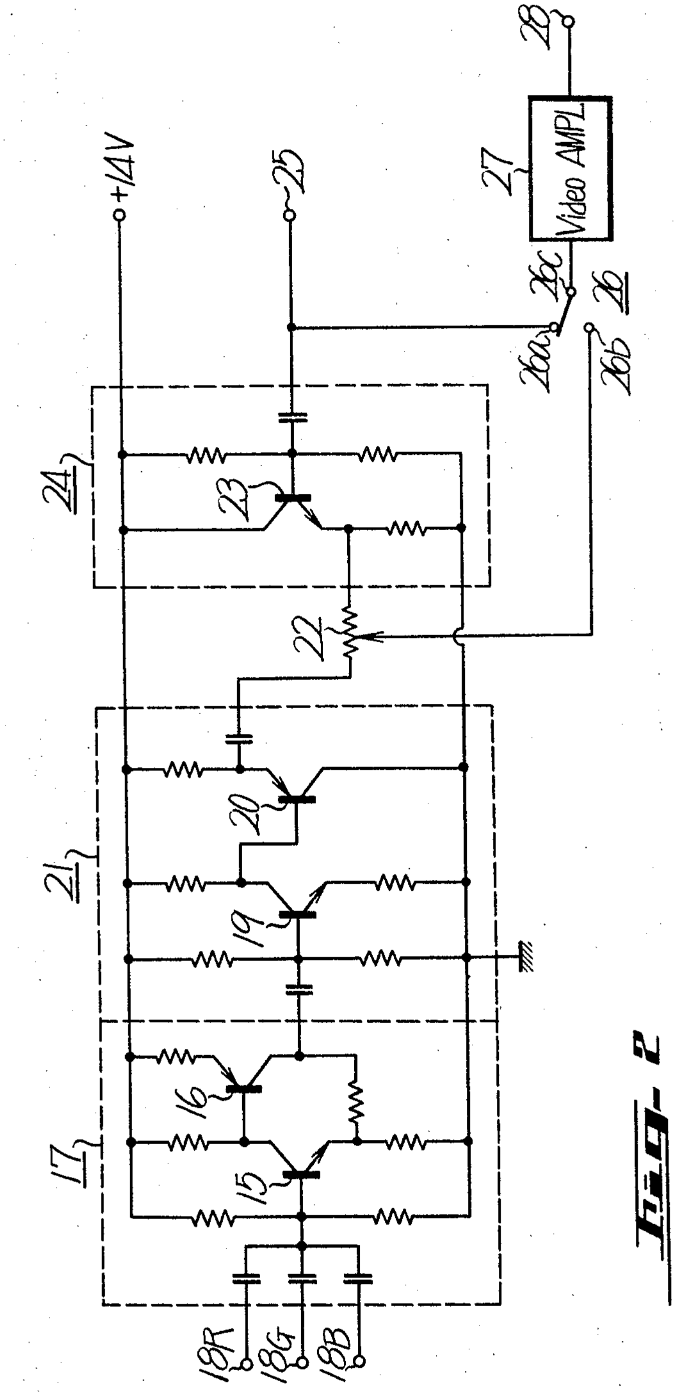
FIG. 2 is a connection diagram illustrating one example of a subtracting circuit employed in the present invention.

In FIG. 2 there is specifically shown one example of the subtracting or difference signal circuit 7. Input terminals 18R, 18G and 18B of an amplifier 17 consisting of transistors 15 and 16 receive from process amplifier 5*b* predetermined amounts of red, green and blue signal components of substantially the same band as that of the luminance signal so as to provide a composite luminance signal at the output of amplifier 17. The output of the amplifier 17 is further amplified by an amplifier 21 made up of transistors 19 and 20 as is applied to one end of a volume control 22. An input terminal 25 of a polarity inverter circuit 24 consisting of a transistor 23 is supplied with the luminance signal derived from the vidicon 2*a* and the output end of the inverter circuit 24 is connected to the other end of the volume control 22. The input terminal 25 is also connected to a contact 26*a* of a switch 26, and another contact 26*b* of that switch is connected to a sliding contact of the volume control 22. A movable contact 26 *c* of switch 26 is connected to the input end of a video amplifier 27 and, so long as contact 26*c* engages contact 26*a* the luminance signal is supplied through an output terminal 28 of the video amplifier 27 to the monitoring picture tube 8. However, by selectively moving contact 26*c* to engage the contact 26*b*, a difference or error signal corresponding to the difference between the luminance signal is applied to the monitoring picture tube 8 for indicating the registration or misregistration of the two images on the two vidicons.

Figure 3:
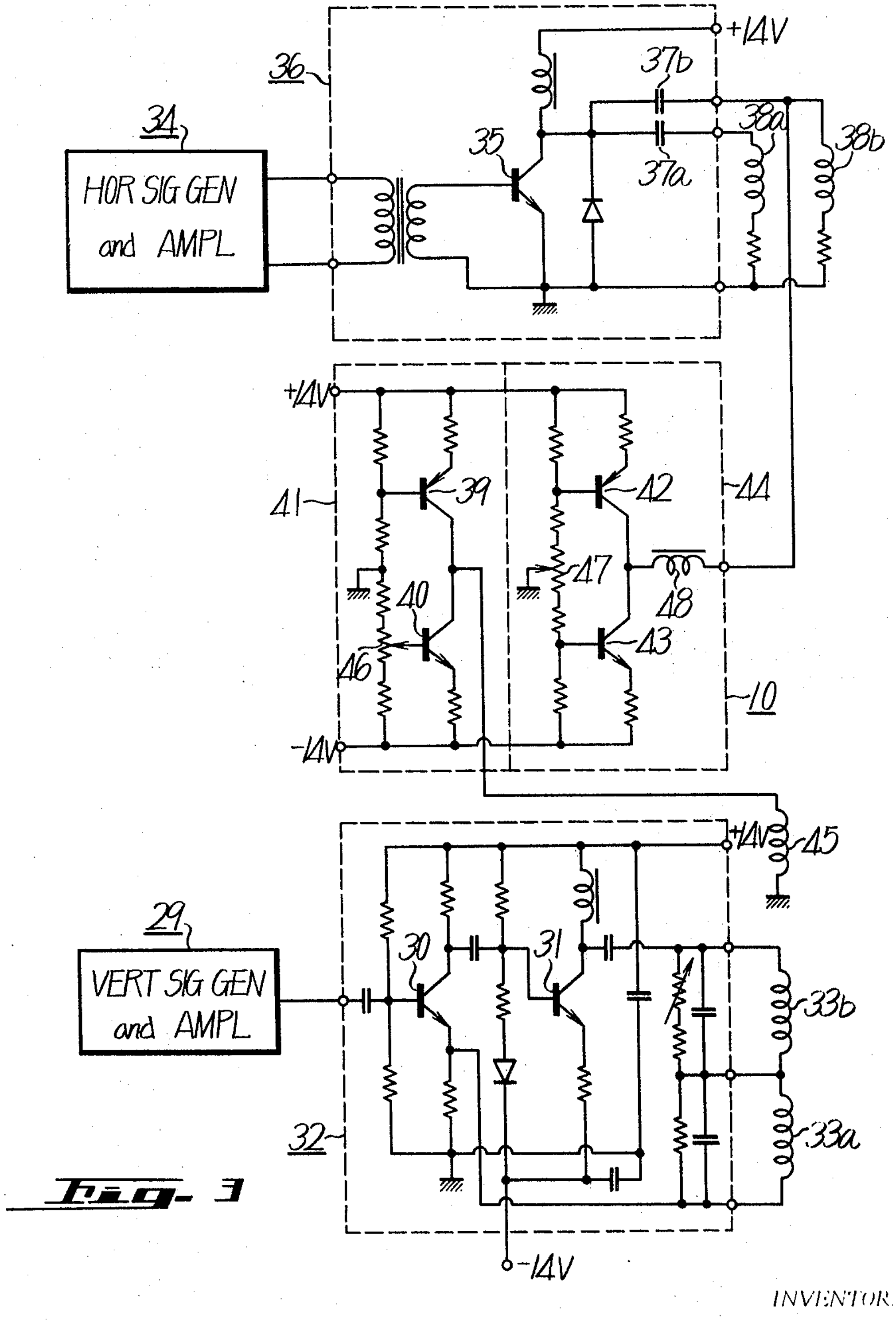
FIG. 3 is a connection diagram showing one example of each of a deflection circuit and a centering circuit used in this invention.

FIG. 3 specifically illustrates the principal parts of the deflection circuit 9 and the centering circuit 10. The output of a vertical signal generator and amplifier 29 is fed to a vertical deflection circuit 32 made up of transistors 30 and 31 to simultaneously drive vertical deflection coils 33*a* and 33*b* respectively included in coils 13*a* and 13*b* mounted on the vidicons 2*a* and 2*b*. The output signal of a horizontal signal generator and amplifier 34 is supplied to a horizontal deflection circuit 36 consisting of a transistor 35. The output of transistor 35 is applied through capacitors 37*a* and 37*b* to horizontal deflection coils 38*a* and 38*b* respectively included in coils 13*a* and 13*b* mounted on the vidicons 2*a* and 2*b*. The centering circuit 10 is made up of a vertical centering circuit 41 consisting of a series connection of transistors 39 and 40 and a horizontal centering circuit 44 consisting of a series connection of transistors 42 and 43. The collector of the transistor 40 is connected to a vertical centering coil 45 included in the coil L. The base potential of the transistor 40 is adjustable by a volume control 46. Adjusting the volume control 46 changes the collector current of the transistor 40, and thereby causes a change in a current flowing in the coil 45 to vertically move the beam deflection center in the vidicon having the coil 45 associated therewith.

A volume control 47 is connected in common to base circuits of the transistors 42 and 43 and a connection point between the collectors of transistors 42 and 43 is connected through a choke coil 48 to a connection point between the horizontal deflection coil 38*b* and the capacitor 37*b*. By adjusting the volume control 47, a DC current is superimposed on the horizontal deflection coil 38*b* to shift the horizontal beam deflection center of the respective vidicon. Consequently, with the switch 26 positioned to engage contact 26*c* with contact 26*b*, accurate registration of the signals from the two vidicons and hence of the pictures reproduced therefrom, can be achieved by adjusting the volume controls 46 and 47 in a manner to extinguish the reproduced picture on the monitoring picture tube 8.

Although the centering operation is electrically achieved in the foregoing, it is also possible to mechanically move the deflection coils for the same purpose.

Although an illustrative embodiment of the invention has been described in detail herein, it is to be understood that the invention is not limited to that precise embodiment, and that various changes and modifications may be effected therein by one skilled in the art without departing from the scope or spirit of the invention.

I claim:

1. In combination with a color television camera including a first image pickup tube onto which an image of an object to be televised is projected, circuit means for deriving a first luminance signal from said first tube and which corresponds to said image projected thereon, a second image pickup tube onto which there is projected a color-separated image of said object and means for deriving from said second tube a plurality of color video signals based on said color-separated image; a system for obtaining registration of pictures to be reproduced from said luminance signal and said color video signals comprising circuit means for producing a second composite luminance signal from the output of said second image pickup tube, circuit means for detecting a difference between said first and second luminance signals, and centering means associated with one of said image pickup tubes and being operative thereon to eliminate any detected difference between said first and second luminance signals.

2. The combination according to claim 1, in which said circuit means for detecting a difference between said first and second luminance signals and means to produce an error signal in response to a detected difference between the compared luminance signals.

3. The combination according to claim 2, further comprising means to display said error signal.

4. The combination according to claim 1, in which each of said image pickup tubes has deflection means to cause scanning movement of an electron beam therein, and said centering means is connected with said deflection means for one of said image pickup tubes to vary the centered position of the respective beam in the sense for eliminating any detected difference between said first and second luminance signals.

5. The combination according to claim 4, in which said deflection means includes horizontal and vertical deflection coils to receive horizontal and vertical sweep signals, and said centering means is connected with at least one of said coils and is operative to supply an adjustable controlled DC current thereto.

6. The combination according to claim 4, in which said deflection means includes horizontal and vertical deflection coils to receive horizontal and vertical sweep signals and a centering coil on one of said image pickup tubes, and said centering means is connected with said centering coil and is operative to supply an adjustable controlled DC current thereto.